US009875456B2

(12) United States Patent
Favier

(10) Patent No.: US 9,875,456 B2
(45) Date of Patent: Jan. 23, 2018

(54) DEVICE FOR PROTECTING A COMMERCIAL ARTICLE AGAINST THEFT

(71) Applicant: EXAQTWORLD, Joinville le Pont (FR)

(72) Inventor: Alain Favier, Nogent sur Marne (FR)

(73) Assignee: EXAQTWORLD, Joinville le Pont (FR)

( * ) Notice: Subject to any disclaimer, the term of this patent is extended or adjusted under 35 U.S.C. 154(b) by 0 days.

(21) Appl. No.: 14/403,827

(22) PCT Filed: May 27, 2013

(86) PCT No.: PCT/FR2013/051161
§ 371 (c)(1),
(2) Date: Nov. 25, 2014

(87) PCT Pub. No.: WO2013/175149
PCT Pub. Date: Nov. 28, 2013

(65) Prior Publication Data
US 2015/0145680 A1  May 28, 2015

(30) Foreign Application Priority Data

May 25, 2012 (FR) ..................................... 12 54885
Aug. 23, 2012 (FR) ..................................... 12 57972

(51) Int. Cl.
*G06Q 10/08* (2012.01)
*E05B 73/00* (2006.01)
(Continued)

(52) U.S. Cl.
CPC ....... *G06Q 10/087* (2013.01); *E05B 73/0017* (2013.01); *G06K 7/10009* (2013.01);
(Continued)

(58) Field of Classification Search
CPC ............ E05B 73/0017; G08B 13/2402; G08B 13/2434; G08B 13/246; G08B 13/2462;
(Continued)

(56) References Cited

U.S. PATENT DOCUMENTS 4,514,815 A * 4/1985 Anderson .............. G06Q 10/08
235/385
6,540,143 B1 * 4/2003 Matsumori .............. G06K 7/14
235/382
(Continued)

FOREIGN PATENT DOCUMENTS

BE    1 004 849 A7    2/1993
EP    1 610 263 A1   12/2005
(Continued)

OTHER PUBLICATIONS

International Search Report, dated Jul. 24, 2013, from corresponding PCT application.
(Continued)

*Primary Examiner* — Hongmin Fan
(74) *Attorney, Agent, or Firm* — Ipsilon USA

(57) ABSTRACT

A device for protecting a commercial article which is a physical object (10, 32), that may or may not be packaged, against theft. The device (12, 42) includes: at least one active or passive member that is capable of emitting electromagnetic waves out from the device or receiving electromagnetic waves from outside the device; elements for attaching and locking the device to the physical object or to the packaging of same in a locked position such that a user cannot separate the device from the physical object without an external tool, the locking elements including a locking mechanism; and at least one optically readable code (24) uniquely identifying the physical object to which the device is intended to be attached and which is separate from a (Continued)

commercial article code (EAN, EPC, etc.) assigned to the physical object, as a commercial article.

22 Claims, 4 Drawing Sheets

(51) Int. Cl.
| | | |
|---|---|---|
| G08B 13/24 | (2006.01) | |
| G06K 19/077 | (2006.01) | |
| G06K 19/06 | (2006.01) | |
| G06K 19/07 | (2006.01) | |
| G06K 7/10 | (2006.01) | |
| G06Q 30/00 | (2012.01) | |
| G06Q 30/06 | (2012.01) | |
| G06K 17/00 | (2006.01) | |

(52) U.S. Cl.
CPC .. *G06K 19/06018* (2013.01); *G06K 19/06037* (2013.01); *G06K 19/06046* (2013.01); *G06K 19/0723* (2013.01); *G06K 19/07745* (2013.01); *G06K 19/07766* (2013.01); *G06Q 30/0185* (2013.01); *G06Q 30/06* (2013.01); *G08B 13/2405* (2013.01); *G08B 13/246* (2013.01); *G08B 13/248* (2013.01); *G08B 13/2434* (2013.01); *G08B 13/2448* (2013.01); *G08B 13/2462* (2013.01); *G06K 2017/0045* (2013.01)

(58) Field of Classification Search
CPC ....... G06K 19/06018; G06K 19/06028; G06K 19/06037
See application file for complete search history.

(56) References Cited

U.S. PATENT DOCUMENTS

| | | | |
|---|---|---|---|
| 7,228,282 B1* | 6/2007 | Philyaw | G06Q 10/087 705/26.9 |
| 7,501,954 B1 | 3/2009 | Chung | |
| 8,469,270 B1* | 6/2013 | Rothschild | G06F 17/30312 235/375 |
| 2004/0233042 A1 | 11/2004 | Piccoli et al. | |
| 2004/0263319 A1 | 12/2004 | Huomo | |
| 2005/0061874 A1 | 3/2005 | Mathewson, II et al. | |
| 2005/0061878 A1* | 3/2005 | Barenburg | G06K 7/1434 235/385 |
| 2006/0022826 A1* | 2/2006 | Higham | G06Q 10/087 340/572.1 |
| 2006/0144940 A1 | 7/2006 | Shannon et al. | |
| 2007/0156281 A1 | 7/2007 | Leung et al. | |
| 2007/0192123 A1 | 8/2007 | Sagan et al. | |
| 2008/0073432 A1* | 3/2008 | Barenburg | G06Q 10/08 235/385 |
| 2009/0038401 A1* | 2/2009 | Kibblewhite | G01N 29/048 73/761 |
| 2010/0164691 A1 | 7/2010 | Berkhouwer | |
| 2011/0108616 A1* | 5/2011 | Wang | G06K 7/0004 235/375 |
| 2012/0102802 A1* | 5/2012 | Lodi | E05B 73/0017 40/662 |
| 2012/0290440 A1* | 11/2012 | Hoffman | G06Q 30/0623 705/26.62 |

FOREIGN PATENT DOCUMENTS

| | | |
|---|---|---|
| EP | 1 788 516 A1 | 5/2007 |
| EP | 2 325 777 A2 | 5/2011 |
| FR | 2 947 086 A1 | 12/2010 |
| WO | 2006/099123 A2 | 9/2006 |
| WO | 2008/069643 A1 | 6/2008 |

OTHER PUBLICATIONS

FR Search Report, dated May 17, 2013, from corresponding FR application.

\* cited by examiner

DEVICE FOR PROTECTING A COMMERCIAL ARTICLE AGAINST THEFT

The invention relates to a device, a system and a method for identifying a commercial article and/or protecting it against theft.

The sales area for commercial articles in a shop is afflicted by several types of loss of earnings, which are grouped under the term "inventory shrinkage" or IS. IS can be divided into three parts:
- external theft (customers), which represents 30 to 40% of IS and is characterized by ill-intentioned customers leaving the shop with articles that have not been paid for or who change the prices or percentage discounts before going to the checkout;
- internal theft (employees) which represents 30 to 50% of IS and is characterized by ill-intentioned employees who either remove antitheft badges (such as resonant "tags") from articles because they have access to the unlocking or deactivation systems or do not collect all or some of the amount for articles handed to another person who they know (fraudulent collection);
- administrative errors, collection errors and inventory differences, which represent the rest of the IS.

To date, the battle against IS has involved shops using video surveillance, security guards and/or antitheft badges, which are attached to articles on sale and trigger an alarm when passing between antitheft gates positioned at the entrances and exits of shops if they have not previously been removed at the checkout.

However, antitheft badges are not effective in cases in which an ill-intentioned person substitutes a price tag on an article for that of another article or when a checkout employee scans the bar code on the tag (EAN code, EPC, etc.) of a low-priced article and sells, to a person of his choice, one or more higher-priced articles.

Video surveillance is also not sufficiently effective to combat internal theft owing to a relatively small personnel for surveying video screens, a large number of persons to be surveyed in large shops and blind spots that the cameras cannot get to.

Security guards, for their part, are not reliable and can only survey a limited number of persons.

Moreover, a code or a commercial article reference (EAN, EPC, etc.) is generally present (printed or stuck) on each tag (for example made of cardboard or plastic) attached to the article as a physical object, for example bearing the price of the article. The inventor has found that two physical objects that respectively correspond to two commercial articles having the same code or the same commercial article reference (EAN, EPC, etc.) at the point of sale cannot be distinguished from one another in the computer system of the point of sale, which causes problems for article stock inventories and also when several identical commercial articles go through the checkout.

The aim of the present invention is to overcome at least one of the aforementioned drawbacks by proposing, according to a first aspect, a device for protecting a commercial article against theft, said commercial article being a packaged or unpackaged physical object, the device having:
- at least one active or passive component that is capable of transmitting electromagnetic waves to the outside of the device or of receiving electromagnetic waves from the outside,
- means for fixing and locking the device to the physical object or to the packaging thereof in a locked position so that a user cannot separate the device from the physical object without a (specific) external tool, said locking means comprising a locking mechanism,
- at least one optically readable code uniquely identifying the physical object to which the device is intended to be fixed and that is distinct from a commercial article code (bar code with dimensions of EAN, EPC type, etc.) assigned to the physical object, as a commercial article.

Said at least one optically readable code thus allows a distinction to be drawn between two physical objects that respectively correspond to two commercial articles having the same code or the same commercial article reference (EAN, EPC, etc.), which an EAN bar code does not allow.

This commercial article code is generally present (printed or stuck) on tags (for example made of cardboard) attached to articles as physical objects and bearing the price of the articles, for example. The presence of the optically readable code(s) on the device locked to the article as a physical object (which therefore cannot be replaced or falsified), allows this code that is linked to/associated with the commercial article reference/code in the computer system of the shop, and therefore that is linked to/associated with the price of this article, to be read (for example by a checkout employee). Article stock inventories are thus greatly facilitated by the presence of such an optically readable code on a device fixed to the physical object and distinct from the tag bearing the price and the EAN bar code.

It will moreover be noted that when several articles in the same family (for example shirts) that each have a different commercial article reference/code (for example because they are shirts of different color) but an identical price go through the checkout, it is not unusual for the checkout personnel to be happy to read the tag of one article and to multiply the price displayed on the "read" article by the number of articles at the checkout. Such a situation subsequently creates inventory differences. The systematic reading of the optical code from the device that is attached to each article allows a considerable reduction in inventory differences.

Even if the price tag fixed to the article is changed for that of another article (before going through the checkout), reading the optical code allows unambiguous, simple (and with minimum investment), certain and secure identification of the physical object to which the device is fixed (and likewise identification of the device), whether or not the employee reads the bar code (EAN, EPC, etc.) located on the tag with the price. Thus, the invention guarantees the shopkeeper and the consumer that the physical object to which the device is fixed is being sold/purchased at the price corresponding to the commercial article rather than to another article, notably following fraudulent action. The reading of the optically readable code constitutes a second possible reading/identification of the article as a physical object (besides that for the bar code or commercial article reference/code borne by the tag attached to the article).

The addition/integration of at least one optically readable code to/in the aforementioned device thus allows security to be provided for the article vis-à-vis possible frauds committed in the shop in which the article is on sale.

The active or passive component(s) capable of transmitting electromagnetic waves to the outside of the device or of receiving electromagnetic waves from the outside is/are, by way of example, housed in the device and inaccessible from the outside. They are capable of cooperating with a complementary system/element for protection/detection against theft (for example antitheft gate situated at the access points for a shop) and of triggering an alarm when the device, still locked to the physical object, comes close to the complementary system/element; this or these component(s) thus provide(s) part of the antitheft function of the device in cooperation with the aforementioned complementary system/element; such a component is a resonant electrical circuit, for example, that begins to resonate, in a known manner, under the action of excitation waves transmitted at the resonant frequency of the circuit.

It will be noted that the device is fixed to the article to be protected or to the packaging thereof containing it and is locked to the article or the packaging thereof by virtue of the locking mechanism inside the device, which is inaccessible from the outside. This mechanism requires a tool to unlock (deactivate) it such as a magnet for some types of device or a tool with a mechanical mechanism when the locking mechanism is of hook type for example.

According to other possible features, taken in isolation or in combination with one another:

said at least one optically readable code is not accessible from the outside of the device; the code can thus be read from the outside of the device but is not accessible to a user or an employee of the shop, and it is therefore protected from fraud, vandalism and other, involuntary (mechanical, chemical, etc.) external attacks; by way of example, said at least one optically readable code is protected from the outside of the device by an interface or interface component with transparent protection that allows said code to be read through it; by way of example, said at least one optically readable code is printed or stuck on a medium that may or may not be part of the device and that is encapsulated in the device or protected by a film, a varnish or a transparent sticker, for example;

said at least one optically readable code is capable of being read by an electronic communication appliance, for example mobile (for example a consumer communication appliance), such as a smartphone; in this way, customers of the shop who are equipped with such an appliance can read this code (without modifying it) and have access, in certain fashion, to information about the article on sale that is fitted with the device; the device bearing said at least one optically readable code thus serves as a communication interface or relay between the article (product) and the user; the employees of the shop can likewise read the code in order to make sure of its link to the EAN code that is present on the tag attached to the article or for inventory needs or else in order to recover commercial information about the article/product;

said at least one optically readable code is representative of a URL address for a site or for a web page in relation to the commercial article to which the device is intended to be fixed and locked; this allows customers to be provided rapidly and directly with additional information about the article and with details that only a sales person would be able to provide; this is particularly advantageous in the case of a sales person being temporarily unavailable, for example owing to a rush; moreover, the use of an optically readable code integrated in the device is, for a user, a secure point of entry/access (via the Internet network) to information recorded securely in electronic form (in a remote computer system such as a server) and not present on the article (and therefore not directly accessible and falsifiable by a person who is present in the shop); this secure point of entry/access allows the user to access a secure transaction process (online payment), for example, which does not require a checkout to be visited in order to pay for the article (the user is thus certain that he is purchasing the correct article at the correct price);

said at least one optically readable code incorporates a string of alphanumeric characters that is decodable by a software application that can be executed on an electronic communication appliance such as a smartphone, so as in this way to allow unique and secure identification of the commercial article (for example by means of information about this article); said at least one optically readable code does not incorporate any printing directly representing a URL address dedicated to the article such as "http//...product1/trade name/...; thus, the code may be of simple design, that is to say that it has fewer data to decode and is therefore more easily decodable (this means that it may likewise be of smaller size because it carries less information); moreover, the code can easily be reused an unlimited number of times to identify other commercial articles, thus making the device according to the invention "recyclable";

the decoding allows access to a secure memory area of a computer system, which memory area has an association table recorded that sets up an association between said at least one optically readable code and the commercial article/commercial article code (EAN, etc.) and notably the point of sale of the commercial article; this association table sets up a link to the commercial article to which the device is fixed and notably to information relating to said article, namely its price, its location, its description, its commercial article code (EAN, EPC, etc.), one or more URL addresses dedicated to the article, etc.; by modifying the association table it is a simple matter to dissociate said at least one optically readable code from the commercial article and to reassign it to another commercial article while the device bearing said at least one optically readable code is fixed to the new corresponding physical object;

the decoding allows a secure connection to be set up to a URL address for a site or for a web page dedicated to the commercial article by means of an association table setting up an association between said at least one optically readable code, said URL address and possibly a commercial article code (EAN, etc.);

said at least one optically readable code is a two-dimensional code such as a QR code or a code of data matrix type;

said at least one optically readable code exhibits a coding density that allows it to be decoded easily and rapidly by a communication appliance, for example mobile, fitted with an optical code reader/decoder;

said at least one optically readable code exhibits a reduced size of 7 mm×7 mm in order to be able to be read easily by a communication appliance, for example mobile, fitted with an optical code reader and carried by a person standing beside the object;

said at least one optically readable code is capable of being reassigned to the unique and secure identification of a plurality of other physical objects to each of which the device is intended to be successively fixed; the optically readable code can thus easily be associated with other commercial article codes (EAN, EPC, etc.) in the computer system of the shop, and the device bearing said optically readable code is fixed to the corresponding article (physical object);

the device may be fitted with an RFID component or radio identification component (transponder or radio tag comprising a silicon chip an an antenna, and possibly a battery) that has a unique identifier TID; this identifier is associated with the optically readable code and likewise serves as an unambiguous identifier for the physical object to which the device is fixed; reading the identifier TID, for example using an RFID reader gun, constitutes other possible reading/identification of the device for the purpose of certain and secure identification of the physical object; it will be noted that the optically readable code can be created independently of the identifier TID for reasons of simplification and can then be associated therewith in a memory of a computer system;

the device comprises two portions, namely a head equipped with a point that is intended to pass through the physical object or the packaging thereof and a body that is provided with an orifice for the insertion of the point and of locking means for said point in the body, said at least one optically readable code being borne by the head and/or the body; alternatively, the device may be in a single piece having two clamping components forming clips, which, under the action of a clamping control system implemented by an employee of the shop during installation on the physical object, clamp the object or the packaging thereof in locked fashion as described in French patent application No 2 942 835.

The invention also relates, according to a second aspect, to a device for identifying a commercial article that is a packaged or unpackaged physical object, said device having:

means for fixing and locking the device to the physical object or to the packaging thereof in a locked position such that a user cannot separate the device from the physical object without an external tool, said locking means comprising a locking mechanism, at least one RFID component that has a unique identifier TID and that is capable of being read both according to a first range of radio frequencies for short-range reading (instead of the optically readable code(s) of the device according to the first aspect above) and according to a second range of radio frequencies for long-range reading or at least one first RFID component (first radio identification transponder instead of the optically readable code(s) of the device according to the first aspect above) that has a unique identifier TID1 and that is capable of being read according to a first range of radio frequencies for short-range reading and at least one second RFID component (second radio identification transponder) that has a unique identifier TID2 and that is capable of being read according to a second range of radio frequencies for long-range reading.

The short-range reading of an RFID component is faster than the reading of an optical code, which is advantageous in some circumstances.

By way of example the second RFID component is used for management (inventory, etc.) of the article in the shop with the personnel of the shop, while the first RFID component is used as a communication interface for communication with customers (via a communication appliance as described above).

It will be noted that each transponder (RFID component/electronic chip with antenna) may have a unique identifier TID and identify the physical object to which the device is intended to be fixed, the identifier TID, which is different from one transponder to the other, being distinct from a commercial article code (bar code with dimensions of EAN, EPC type, etc.) assigned to the physical object, as a commercial article.

The device may likewise be a device for protecting the article against theft and, to this end, have the features of the device according to the first aspect. Thus, the device is a device for protecting a commercial article against theft and comprises at least one active or passive component that is capable of transmitting electromagnetic waves to the outside of the device or of receiving electromagnetic waves from the outside.

According to other features taken in isolation or in combination with one another:

the RFID component(s) cannot be accessed from the outside of the device;

the unique identifier TID, TID1 is capable of being read at short range by an electronic communication appliance such as a smartphone;

the unique identifier TID, TID1 is representative of a URL address for a site or a web page in relation to the commercial article to which the device is intended to be fixed and locked;

the unique identifier TID, TID1 incorporates a string of alphanumeric characters that is decodable by a software application that can be executed on an electronic communication appliance such as a smartphone, so as in this way to allow unique and secure identification of the commercial article;

the decoding allows access to a secure memory area of a computer system, which memory area has an association table recorded that sets up an association between the unique identifier TID, TID1 and the commercial article/commercial article code (EAN, etc.) and notably the point of sale of the commercial article;

the decoding allows setup of a secure connection to a URL address for a site or for a web page dedicated to the commercial article by means of an association table setting up an association between the unique identifier TID, TID1, said URL address and possibly the commercial article code (EAN, etc.).

It will be noted that the features and advantages mentioned above in relation to the first aspect of the invention likewise apply to the device according to the second aspect of the invention.

The invention likewise relates, according to a third aspect, to a system for providing security for a commercial article, comprising:

at least one device as briefly outlined above, means for associating said at least one optically readable code with a commercial article code (EAN, EPC, etc.) assigned to the physical object, as a commercial article, to which the device is intended to be fixed; this association is made in software form in the memory area in the computer system of the shop.

According to other possible features, taken in isolation or in combination with one another:

the system comprises a communication appliance, for example mobile, such as a smartphone or an electronic tablet of iPad type, which is capable of reading said at least one optically readable code;

said at least one optically readable code is representative of a URL address for a site or for a web page dedicated to the commercial article;

said at least one device is fitted with an RFID component that has a unique identifier TID; such an identifier is generally not visible from the outside of the device, unlike said at least one optically readable code;

the system has means for associating the identifier TID with said at least one optically readable code of said at least one device and/or with the commercial article code (EAN, EPC, etc.); thus, the reading/identification of one or other among said at least one optically readable code and the identifier TID allows unique and secure identification of the physical object to which the device is fixed;

the system has means for associating the identifier TID with the URL address of the site or of the web page dedicated to the commercial article and possibly with the commercial article code (EAN, EPC, etc.);

the system has means for recording each association in a memory area of a computer system;

the system has the association of the identifier TID with said at least one optically readable code of said at least one device is recorded in a first memory area;

the association of the identifier TID with the URL address of the site or of the web page dedicated to the commercial article and to said commercial article code (EAN, EPC, etc.) is recorded in a second memory area;

the system has means for recording, in a memory area of a computer system, firstly, each reading of said at least one optically readable code of the device by an electronic mobile communication appliance (50) such as a smartphone and, secondly, each subsequent action performed by a user by means of said appliance on the basis of the information that the user has been able to access following the reading of said at least one optically readable code;

the system comprises:
  two devices as briefly set out above and, each having a first and a second optically readable code (QR1, QR2) uniquely identifying a first and a second physical object to which the two devices are respectively intended to be fixed,
  means for associating each of the first and second optically readable codes (QR1, QR2) with one and the same commercial article code (EAN, EPC, etc.) assigned to the first and second physical objects, thus allowing the first physical object to be distinguished from the second physical object.

The invention relates furthermore, according to a fourth aspect, to a method for protecting a commercial article to which the device as briefly set out above is intended to be fixed, the method comprising the association of said at least one optically readable code of the device with the commercial article code (EAN, EPC, etc.) assigned to the physical object, as a commercial article, to which the device is intended to be fixed. As already mentioned above, this association makes it a very simple matter, in a memory area of a computer system, to set up a temporary link between said at least one optically readable code and the commercial article to which the device will be fixed.

According to other possible features, taken in isolation or in combination with one another:

the method comprises the fixing and locking of the device to a physical object that has been assigned the commercial article code (EAN, EPC, etc.) that is associated with said at least one optically readable code of the device; this ensures the traceability of the commercial article as physical object, and the identification of the article is secure, as is collection for the article when it goes through the checkout; inventory differences due to collection errors and to internal and external theft are thus avoided;

the device being compliant with the above, the method comprises the association between said at least one optically readable code and the commercial article and notably the information about the point of sale of the commercial article and possibly the URL address of the site or of the web page dedicated to the commercial article;

the device being compliant with the above, the method comprises the association of the identifier TID with said at least one optically readable code of said at least one device and/or with the commercial article code (EAN, EPC, etc.);

the device being compliant with the above, the method comprises the association of the identifier TID with the URL address of the site or of the web page dedicated to the commercial article and possibly with the commercial article code (EAN, EPC, etc.);

the method comprises the recording of each association in a memory area of a computer system;

the method comprises the recording, in a memory area of a computer system, firstly, of each reading of said at least one optically readable code of the device by an electronic mobile communication appliance such as a smartphone and, secondly, of each subsequent action performed by a user by means of said appliance on the basis of the information that the user has been able to access following the reading of said at least one optically readable code; thus, a history of the reading of various optical codes by the user is stored in memory, as is a history of the purchases made via his appliance and/or of the articles kept as favorites or in his shopping basket, of the various points of sale at which the codes have been read, etc.

the method comprises the dissociation of said at least one optically readable code and/or the identifier TID borne by the device with the commercial article code (EAN, EPC, etc.) assigned to the physical object when a commercial transaction has been carried out on said physical object and said device has been separated from the latter; said at least one optically readable code borne by the device can then be reassociated with a new commercial article (new commercial article code, new information relating to this article and new dedicated URL address(s)) in the memory area of the computer system.

The invention also relates, according to a fifth aspect, to the use of a device as briefly set out above that is fixed to a physical object as a commercial article, the use comprising the reading of said at least one optically readable code of the device by a mobile electronic communication appliance such as a smartphone, a touch-sensitive tablet, etc. A link is thus set up between the article, the shop at which the article is sold and the user (consumer) via the appliance and the optically readable code.

According to other possible features, taken in isolation or in combination with one another:

the reading of said at least one optically readable code comprises the decoding of the string of alphanumeric characters by the software application executed on the electronic mobile communication appliance;

the decoding comprises access to a secure memory area of a computer system, which memory area has an association table recorded that sets up an association between said at least one optically readable code and the commercial article and notably the location of the commercial article;

the use comprises the identification of the user of the mobile communication appliance who wishes to access the secure memory area and, in the case of a new user, the creation of a user account; the access to the secure memory area is accompanied by the provision of information by the user for identification purposes (for example: user name, password, etc.);

the use comprises the setup of a secure connection to a URL address for a site or for a web page dedicated to the commercial article by means of the association table that sets up an association between said at least one optically readable code and said URL address; this connection is set up automatically and the user is thus redirected to the address(es) in question.

The use may likewise comprise at least one of the following actions triggered on the basis of the site or the web page displayed (for example on the basis of information about the physical object that can be accessed on the site or the web page displayed) on the mobile communication appliance:

obtainment of a number of physical objects in stock that have the same commercial article code (EAN, EPC, etc.), obtainment of the features of the physical object, selection and storage of the commercial article in a virtual basket or in a list of selected articles, performance of a (payment) transaction for the purpose of purchasing the physical object fitted with the device or other physical objects (for example by means of autocollection (without resorting to an employee of the shop to perform the payment transaction), performance of a transaction for the purpose of purchasing at least one other physical object in relation to the physical object fitted with the identification device by means of a computer gateway between, firstly, said site or said web page displayed on the mobile communication appliance and dedicated to the commercial article and, secondly, another site or another web page offering identical and/or associated commercial objects/articles, unlocking of the device of the physical object upon recording of the payment by the customer (for example in order to be able to issue with certainty and unequivocally a purchase receipt for the customer, thus guaranteeing with certainty the transaction on the article, both for the customer and for the shop, with the article selected by the customer thus having been purchased/sold at the corresponding price), conservation of the reading of optical codes in the appliance for the subsequent purposes of consultation and/or purchase at the point of sale at which the article has been identified and "read" or at other points of sale.

It will be noted that the features and advantages presented above in relation to the system according to the third aspect of the invention, the method according to the fourth aspect of the invention and the use of the device according to the fifth aspect of the invention likewise apply to the device according to the second aspect (association of codes, reading of codes, decoding, etc., recording of associations, association tables, etc.). All that concerns said at least one optical code in the third, fourth and fifth aspects therefore likewise applies to the code TID of the single RFID component or of the RFID component that can be read at short range, except in the case of technical impossibility (for example owing to features and/or advantages peculiar to the technology of the optically readable code(s)).

Other features and advantages will become apparent in the course of the description that follows, which is provided solely by way of nonlimiting example and with reference to the appended drawings, in which.

Figure 5:
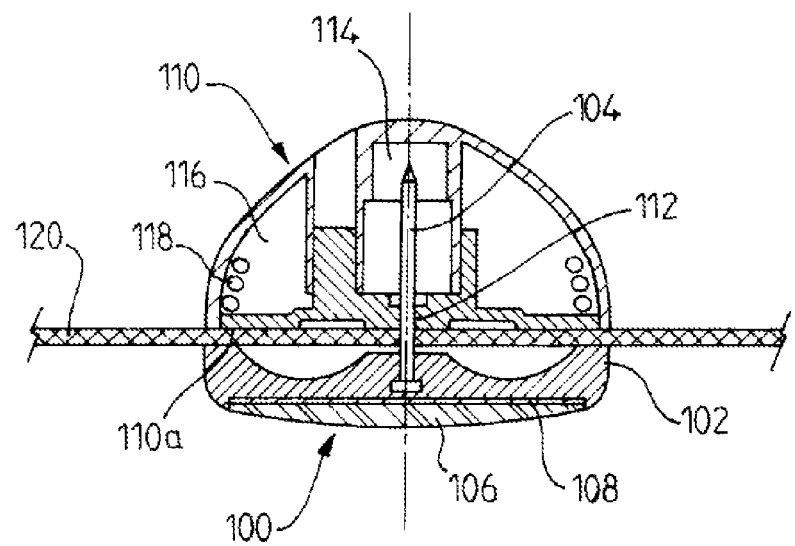
Figure 6:
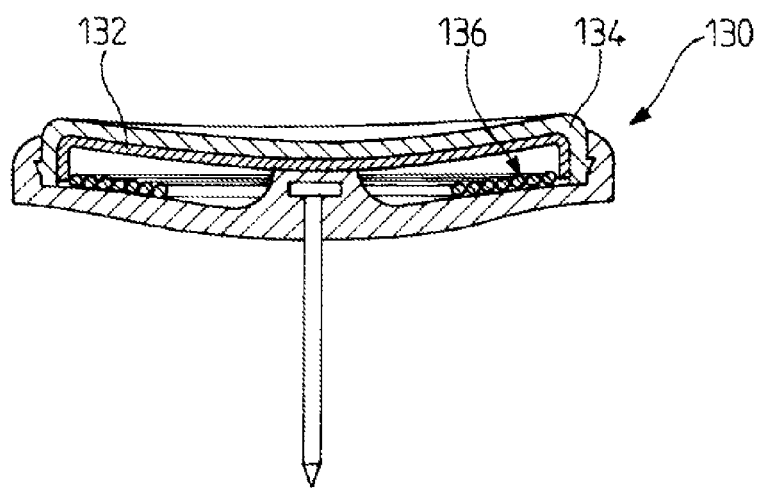

FIG. 5 schematically illustrates an example of an antitheft device to which the invention may apply;

FIG. 6 illustrates another example of part of an antitheft device to which the invention may apply.

Figure 1:
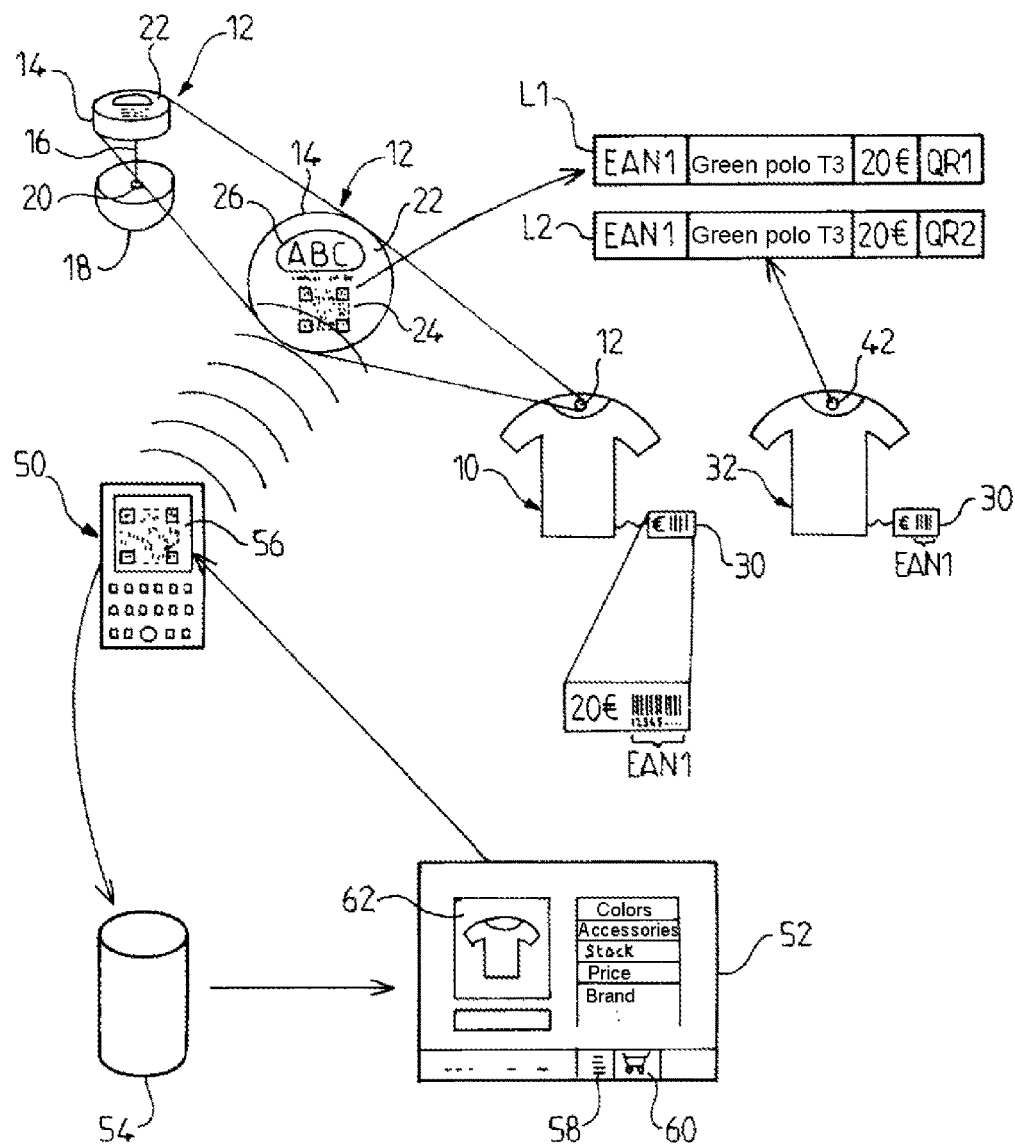
FIG. 1 is a general schematic view of the scenario of the invention according to a first embodiment.

As shown in FIG. 1, a commercial article that is a physical object 10 such as a textile article (for example: polo) bears a device 12 that is locked thereto. The device 12 may or may not be an antitheft device. By way of example, this device is the one shown in either of FIGS. 5 and 6 or else one of those described in the French patent No 2 947 086 (clamp). Each of these devices can lose its theft-prevention function and thus constitute a simple device for identifying a commercial article if the specific means providing this function that are integrated in the device are withdrawn. It will be noted that the invention may likewise apply to an antitheft device that has a metal cable or wire with one of its ends locked permanently to the casing of the device and with the opposite end able to be locked/unlocked temporarily to the same casing after the cable has, by way of example, been passed around an object to be protected (for example: bag handle, etc.).

The identification device 12 comprises two portions, namely a head 14 equipped with a point 16 that extends away from the head and that is intended to pass through the physical object 10 or the packaging thereof and a body 18 provided with an orifice 20 for inserting the point inside the body. The body comprises, in a known manner, means for locking the point that has been inserted. The head 14 of the device has a transparent protective interface 22 (glass, plastic film, etc.) behind which are disposed, in a manner readable from the outside of the device, one or more optically readable codes 24 and possibly information 26 that is carried, by way of example, by one and the same medium (for example: printed disk made of paper, plastic, cardboard, etc. or medium forming an integral part of the head) encapsulated in the device. According to a variant, the optical code is on the transparent protective interface itself or inside the latter (in the thickness thereof), or even at another location on the head 14 (if needed, the head can be modified; by way of example the surface area of the transparent protective interface can be reduced and the optical code is borne by an area of the head that is situated next to the interface). According to another variant, the optionally readable code(s) is/are borne by the body 18. Said code(s) is/are integrated in the device when it is produced. It will be noted that the presence of the transparent protective interface is not indispensable and the optical code can be put on at any location that is visible from the outside of the head. Preferably, the optical code is inaccessible from the outside of the device if it is an aim to prevent the possible degradation, modification or removal thereof. The optically readable code 24 is a two-dimensional code and, by way of example, a code of QR type (standing for "Quick Response"), which is likewise known by the name of "flashcode".

Several versions of QR code can be used, notably including: version 1-21x21, 6 to 25 alphanumeric characters; version 2-25x25, 20 to 47 alphanumeric characters; version 3-29x29, 35 to 77 alphanumeric characters; version 4-33x33, 67 to 114 alphanumeric characters; version 10-57x57, 174 to 375 alphanumeric characters; version 40-177x177, 1253 to 4296 alphanumeric characters. By way of example, the code 24 has a print size of 7.4 mm×7.4 mm and is a Version 1 QR code with a correction or redundancy rate of 25%, allowing a string of 8 alphanumeric characters (from 0 to 9 and from A to Z) to be represented. Such a code can be read correctly (for example through the glass of a shop window) by a user whose reading appliance is placed approximately thirty or so centimeters from the code. Moreover, since the code printed on a medium is protected by the transparent interface 22, the print will be degraded very little over time and a redundancy rate of 25% is therefore sufficient. Since the correction rate is very high, the convenience of reading the code is preserved even when there are high levels of degradation in the transparent interface or in the optical code itself if it is not protected by such an interface.

Other types of two-dimensional optically readable codes can be used as an alternative or in addition to a QR code. Among these other codes are codes of data matrix type in a square or rectangular version (with a maximum storage capacity of 3116 numeric characters, 2335 alphanumeric characters or 1556 binary bytes and a correction (redundancy) rate that varies between 3 and 10% depending on the number of characters to be placed in the code) and of Aztec type (with a minimum storage capacity (15×15 module) of 13 numeric characters and 12 alphanumeric characters and a maximum storage capacity (151×151 module) of 3832 numeric characters and 1914 alphanumeric characters).

The device is fixed to the physical object 10 by inserting the point 16 through the textile article (clothing or other article), and the point that has passed through the material that constitutes the article is then introduced into the insertion orifice 20 in the body 18 so as to be locked on the inside, thus locking the device to the object. A user who is not equipped with an external tool such as a powerful magnet, a hook, etc. is unable to separate the device from the object. The optically readable code 24 is captively held or encapsulated behind the protective interface 22, between the latter and the base of the head, and is is therefore not possible to access it from the outside. This is because an unauthorized user is unable to withdraw the protective interface that is fixed to the head in a secure manner. The head may be embedded in a definitive manner (for example: bonding, welding, etc.). Alternatively, the head is not embedded in a definitive manner. However, when the device is installed in a position locked to the article, it is not possible to access the inside of the head and therefore to withdraw the protective interface in order to be able to access the optical code.

The optically readable code 24 uniquely identifies the device 12 in which it is accommodated and, by virtue of this, the physical object 10 to which the device is attached in a locked manner.

As FIG. 1 shows in a first embodiment, the optical code 24, likewise denoted QR1, is associated with/linked to the code EAN1 ("European Article Number", generally 13 digits), which is a commercial article code or commercial reference unequivocally identifying the commercial article (for example: green polo size T3) but not the physical object itself, in the computer system of the shop (database). The reason that the physical object itself is not identified is that the shops have several copies (which each correspond to a distinct physical object) of one and the same commercial article that have had the same article code assigned to them. The code QR1 is distinct from the code EAN1, and the two are connected in the computer table (memory area/database) illustrated in FIG. 1 (row L1 of the table).

A tag 30, generally made of cardboard, is attached to the physical object 10. This tag bears the price of the article/ physical object and a bar code (one-dimensional optically readable code) that represents the code EAN1 assigned to the article. Another physical object 32 corresponding to the same commercial article (green polo size T3) bears the same tag 30, since the price and the bar code are identical. This physical object 32 carries an antitheft device 42, which is identical to the device 12, for example, but has another, unique optically readable code QR2 that is different than the first code 24 (QR1) and that uniquely identifies the device 42 in which it is encapsulated and, by virtue of this, the physical object 32 to which the device is attached in a locked manner. The code QR2 is distinct from the code EAN1 and the two are associated in the table (memory area) illustrated in FIG. 1 (row L2).

Thus, an optical code QR borne by an antitheft or otherwise device allows unique and secure identification of the object to which the device is fixed in a locked manner and, therefore, distinction of two objects, such as 10 and 32, having the same commercial article code (for example: EAN1) from one another.

It will be noted that such an optically readable code can be subsequently reused to identify other objects once the optical code has been dissociated from the commercial article code EAN (computer link between the two codes broken). The code QR1 assigned to the object 10 can thus be assigned to another object having a different (or the same) article code EAN. The code QR1 is then associated with the different article code EAN in the computer system of the shop. The device bearing the code QR1 is fixed to the other object. This reassignment of the optical code can be carried out an unlimited number of times.

The optically readable code (intermediate code serving as a customer interface) is capable of being read (and decoded) by an electronic communication appliance, for example portable (and therefore mobile), which can be carried by a user, such as a mobile telephone of smartphone type. Alternatively, the appliance may be a webcam, a touch-sensitive tablet, etc.

The appliance is equipped with an application for reading (and decoding) the optical code (for example previously downloaded application) and with an Internet navigator. By approaching the communication appliance 50 thus equipped with the antitheft device 12, the appliance can therefore launch the reading application, point the camera at the optical code 24 and capture the image of the optical code. The code 24 has been designed to indirectly and modifiably, for example, represent the URL address of an Internet site or of a web page dedicated to the commercial article. This code incorporates a string of alphanumeric characters that is decodable by the aforementioned reading software application in order to point to a dynamic association table of the type shown in FIG. 1 that contains the URL address corresponding to the code. The decoding of the code by the application automatically and securely authorizes (for example: via a connection of SSL type) the Internet connection to the site or the page 52 hosted on a server 54 and therefore the display of the site or page in question on the screen 56 of the appliance. The user of the appliance has information about the commercial article as a commercial article (features of the article, available sizes and colors, accessories that can be used with the article, price, information about the brand under which the article is on sale, etc.) and likewise information about the article as a physical object, since it is possible to known the number of physical objects in stock by selecting the icon(s) in question. One possibility is for the Internet navigator of the appliance 50 to be able to redirect the user, by means of a computer gateway, to another, second site or another web page (for example a vendor site) that sells the object/article sought by the user that he has not been able to find on the first site 52 (for example: object/article unavailable in stock) or else another object/article in relation to the object equipped with the device that has been read by the appliance at the point of sale. Next, the object/article found on the second site or web page is purchased by the user at the point of sale either directly by going through the checkout or via his appliance 50 on the first site associated with the point of sale. The object/article is subsequently delivered to the user by the commercial entity associated with the second website and the point of sale then reimburses the entity associated with the second web site. Thus, the point of sale can reduce its physical stocks of objects/articles while offering for sale more commercial references for objects/articles.

Other icons 58, 60 allow other actions to be triggered, for example selecting the article visually displayed on the window 62 of the Internet page and placing it in a virtual basket or a selection list 58 in which it will be stored for postponed action: by way of example, an online purchase on the Internet (e-commerce site) that will guarantee the customer, by virtue of capture of the article by the appliance on the basis of the optical code and by virtue of storage thereof in said appliance, that the article that he will receive will be the article that he has previously chosen. It is likewise possible to select the article visually displayed on the window 62 and to place it in a shopping basket 60 for the purpose of immediately purchasing it by making a payment using the appliance 50. There is no possibility of fraud by changing the tag 30 of the object since it is the optical code linked in secure fashion to the object, via the identification device locked thereto, that will make the link to the true EAN code and hence to the true price. Upon recognition/identification of the device and payment for the transaction, the two portions of the device 12 are unlocked using the unlocking tool (for example: uncoupler) situated at the checkout, the physical object (article) is separated from the device and the checkout receipt is printed.

Without the presence of the optically readable code in the device locked to the physical object, it is not possible to guarantee customers that when making a purchase in a shop via the appliance 50, or upon later purchase on the Internet, they will pay the correct price, or receive the correct article, in the correct size and in the correct color.

According to a second embodiment (FIG. 2), an antitheft or otherwise device 70 (identical to the device 12) is equipped with at least one RFID component 72 such as a circuit having a memory chip and an identifier TID (acronym for "Transponder ID") that is unique and unmodifiable. The RFID component 72 is accommodated inside the device as shown schematically in FIG. 2, for example in the body 18 (alternatively it may be arranged in the head 14), and is therefore inaccessible (visible or otherwise) from the outside. This operation is performed when the device is produced.

As stated above, the optically readable code incorporates a string of alphanumeric characters, for example 8 characters (for example: 013B48FC) with a redundancy rate of 25%, which is produced independently of the identifier TID in order to simplify matters.

According to a variant, the code QR1 may be partially or totally linked to the code TID. The reason is that in this variant the optical code QR1 is generated on the basis of the code TID1, using all or part of this code. It is thus possible to use an optical code QR, for example of type "013B48FC", for a code/identifier TID termed useful (8 characters/32 bits) with 7% redundancy and an optical code QR, for example of type "013BF2000BFF48FC", for a code/identifier TID termed unique (16 characters/64 bits) with 7% redundancy, in order to facilitate reading with the retained print size.

Figure 3:
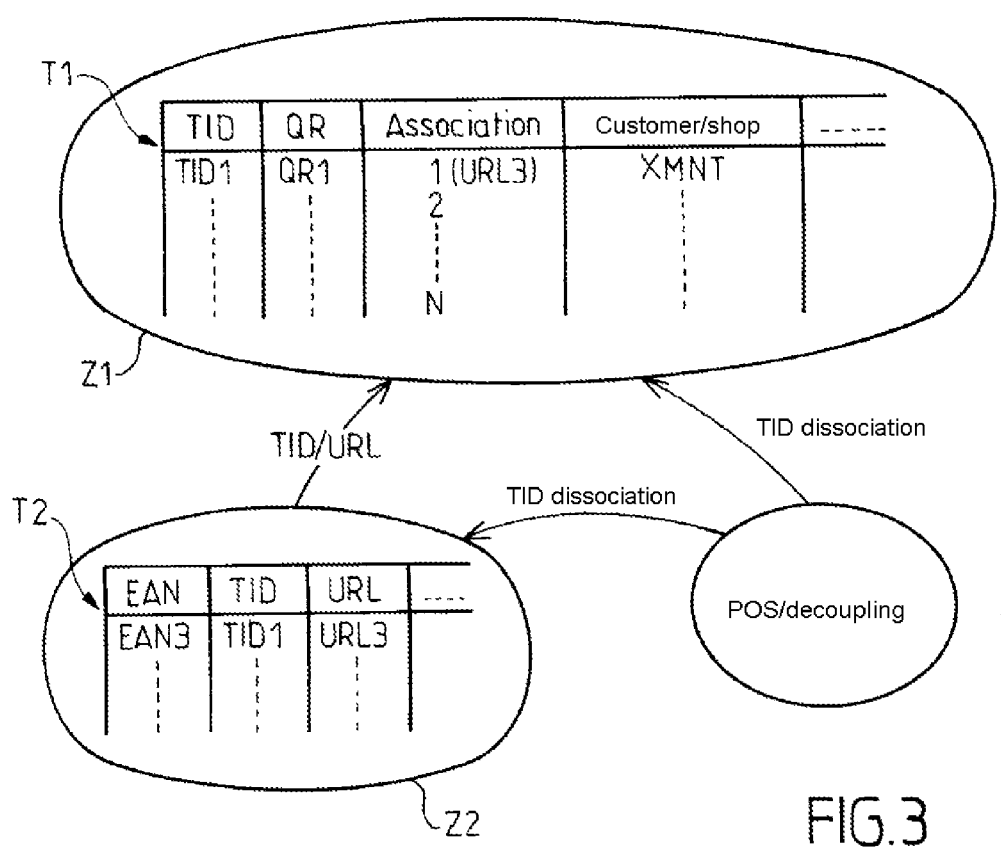
FIG. 3 is a general schematic view illustrating the various associations of codes recorded in memory areas.

The optical code QR1 and the identifier TID1 are associated with one another and recorded in an association table T1 stored in a first memory area Z1 of a computer system as illustrated in FIG. 3. This applies whether the optical code QR is independent of the code/identifier TID or uses all or some of the latter. The device 70 is put onto a commercial article (physical object) 80 bearing a tag 82 equipped with a bar code that is representative of the commercial article code EAN (for example EAN3) stored in the computer system 84 of the shop. By way of example, the computer system 84 is different than the system that contains the recording area Z1.

A portable appliance 86, which is known per se (for example a Motorola MC 3190 appliance), and which is capable of reading the bar codes on the tags of the articles and of programming the RFID chips of the devices, is used to read the bar code on the tag 82. This appliance is connected to the computer system 84 of the shop (database/computer server 84a and computers 84b), which allows, by virtue of the bar code being read, retrieval of the article code EAN3 that, in the computer system, represents the commercial article (description, size, brand, color, price, etc.).

The appliance 86 is likewise used to read the identifier or code TID1 of the physical object 80 and, in this way, to associate it with the article code EAN3 and to record this association in an association table T2 stored in a memory area Z2 of the computer system of the shop as illustrated in FIG. 3. This table likewise contains a large amount of information—not shown—relating to the commercial article (description, size, brand, color, price, etc.) and to point of sale thereof, and also one or more URL addresses, in this case the address URL3, which is dedicated to this article. Thus, the aforementioned codes and information are linked/associated in the table T2.

As shown in FIG. 3, the TID/URL association, in the present case TID1/URL3 for the object/article 80, is transferred in secure fashion to the table T1, where it is recorded in a field called "Association" that sets up a link between the codes TID and QR and the corresponding URL address. It will be noted that this field is created during production when the codes TID and QR are associated and recorded in the table T1. In the example shown, it is the association "1" that associates the codes TID1, QR1 and URL3.

Other information is likewise recorded in the dynamic table T1, such as the customer/shop at which the object/article is presented for the transaction, information relating to the various readings of the optical codes of the devices fixed to the physical objects that are performed by different users (consumers), such as the date and the various actions performed by the user in relation to the optical code in question.

According to a variant, the appliance 86 is used to program or encode the RFID chip 72, that is to say that the code EAN3 is registered in the RFID component, where it is associated with the code TID1.

A mobile communication appliance such as the appliance 50 in FIG. 1 equipped with an Internet navigator and with a software application for reading the optical codes, such as the optical code QR mentioned above, is used to read (decode) the optical code QR1 of the device 70 locked to the article 80, for example.

Figure 4:
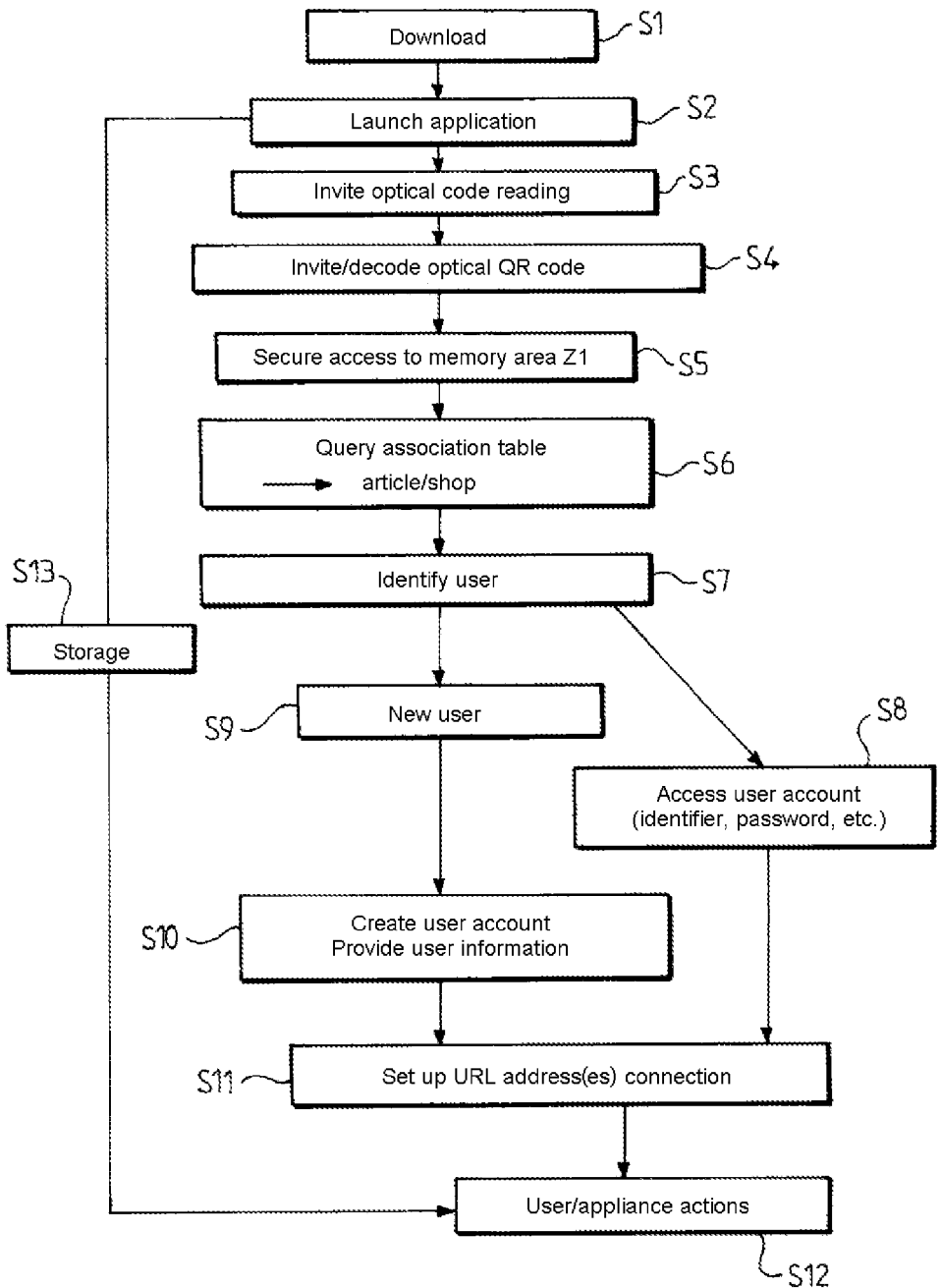
FIG. 4 is a general schematic view illustrating the various functionalities of a software application that can be downloaded on a communication appliance in order to use the optically readable codes integrated in the identification devices according to the invention.

FIG. 4 illustrates the various functionalities and steps performed in relation to this software application, and notably the execution thereof by the appliance 50.

First of all, the application is downloaded by the appliance 50 via the Internet network (step S1) and the application is then launched (step S2) by the user. The user in front of the physical object 80 is invited, in the language of the operating system that is present in the appliance (or in the language chosen by the user if several languages are available), to read (decode) the optical code QR1 (step S3). By pointing the camera of his appliance at the optical code, he digitizes the image of the code and therefore decodes it (step S4). The application connects securely (for example: SSL connection mode) to the memory area Z1 (step S5) and interrogates the table T1 on the basis of the character string of the optical code, which allows unique identification of the commercial article in question and the shop in which the optical code linked to the article/object in a locked fashion has been read (step S6).

The following step S7 provides for identification of the user by asking him for a user name and a password, for example.

If the user has already been recorded in the computer system, he then has access to his user account (step S8), otherwise he is considered to be a new user (step S9) and a user account needs to be created by him by securely providing a certain amount of information allowing him to be identified, such as surname, first name, address, telephone, credit card details for subsequent possible commercial transactions (step S10).

The next step S11 then provides for setup of an Internet connection between the appliance 50 and one or more URL addresses dedicated to the article or in relation thereto (additional articles), namely in this case the address URL3. This link to the corresponding URL address is made possible by virtue of the association table T1 and, more particularly, the association 1 that links the identifier TID1, the code QR1 and the address URL3. The user is thus automatically directed to this address, where he is able to perform various actions from his appliance (step S12) as already described above in relation to the first embodiment (obtaining information about the article, purchase, storage of the article in the appliance for later action, etc.).

Thus, the optical code borne by the identification device of the article incorporates a character string that, following decoding, points to an association table identifying the corresponding article in unique and secure fashion.

Only after steps illustrated in FIG. 4 and described above have been performed is the connection to a URL address set up, notably following identification of the user of the reading appliance 50 for the optical code 24. This optical code therefore does not incorporate a script that points directly to a URL address.

It will be noted that a storage step S13 is present because all the actions of the appliance 50 reading optical code(s) are recorded in the memory of the appliance so that the user keeps a history of the various code reading operations for the purpose of later consultation or purchase.

Equally, all the actions of the appliance 50 reading optical code(s) and all the subsequent actions by the user (step S12) are recorded in the computer system in which the table T1 is stored, or in the latter.

As illustrated in FIG. 3, when the physical object 80 is sold to a user (collection by the shop either directly at a checkout or by means of the appliance 50 and of a secure Internet connection and withdrawal of the device locked to the object by means of decoupling), dissociation needs to be effected between the optical code/identifier TID and the URL address/EAN code corresponding to the object/article (it will be noted that in the embodiment in FIG. 1 the association between the optical code/URL address of the site or of the page dedicated to the commercial article is dissociated). This dissociation is triggered on the basis of knowledge of the transaction on the physical object and is recorded both in the table T1 and in the table T2 (FIG. 3) so as, firstly, to break the link between the various codes and addresses as explained above and, secondly, to preserve a trace of these dissociations as such for the purpose of later use, such as invoicing for services. The device 70 bearing the code QR1 and the identifier TID1 is then ready to be used to identify another physical object as a commercial article as described above.

The codes TID1 and QR1 allow unique, certain and secure reading and hence identification, using two different reading techniques, of the physical object 80, independently of bad reading of the bar code, or a reading of an erroneous bar code following substitution of the tag 82 by mistake or in ill-intentioned fashion. This greatly limits the loss of earnings resulting from the IS. All the other advantages presented above with reference to the description of FIG. 1 apply in this case.

Figure 2:
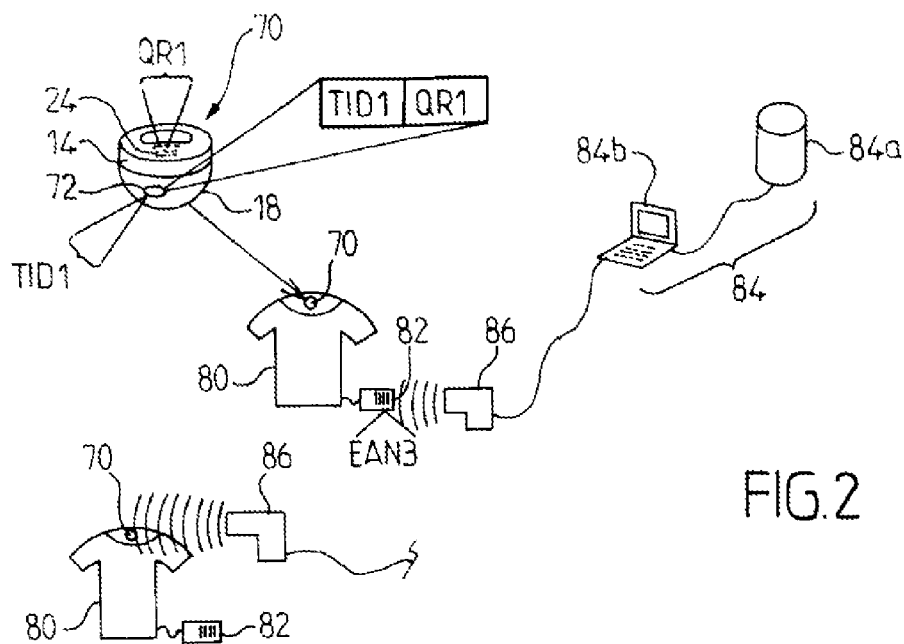
FIG. 2 is a general schematic view of the scenario of the invention according to a second embodiment.

The chain of implementation of the various elements of the system for identifying/providing security for commercial articles in FIG. 1 is substantially the same as that in FIG. 2 that has just been described above, with some adaptations. However, the EAN code is uniquely associated with the optical code QR that constitutes the unique identifier (allows association of the tens of millions of EAN codes) and, when the device is fixed to the article (physical object), the optical code is read and associated with the EAN code of the article to which the device is fixed and hence to the URL address of a site or of the web page dedicated to the commercial article.

According to yet another embodiment, which is not shown in the figures, the antitheft or otherwise device in FIG. 2 is modified by replacing the optically readable code 24 with an RFID chip (transponder or radio tag comprising an electronic chip and an antenna), besides the first RFID chip 72. The second RFID chip replacing the optical code is not necessarily protected by an optically transparent interface, but may be accommodated in a portion of the device 70 or of a device of another type that is not visible (for example: in a single piece).

In this embodiment, the first RFID chip 72 is used by the personnel at the shop, for example for managing the articles. It operates according to a first range of frequencies (for example: 860 to 960 MHz, EPC1 GEN 2 standard) for long-range reading (greater than 30 cm).

The second RFID chip is used by the consumers/customers of the shop, for example as explained above with the optical code. It operates with a second range of frequencies (for example: approximately 13.56 MHz or NFC—"Near Field Contact"—standard) for short-range reading (for example: less than 10 cm, or by contact). Electronic communication appliances such as mobile telephones of smartphone type, for example the models "BlackBerry Bold 9790" or "Acer E320 Liquid Express", can be used to communicate with this customer communication interface (second RFID chip). It will be noted that the identifiers TIDi and TIDj of the two chips are unique, distinct from the commercial article code (EAN, EPC, etc.) of the physical object to which the device is fixed and afford the same advantages of unequivocal identification of the physical object as with the optically readable code. The management/linking of the codes TIDi, TIDj, EAN, URL address, etc. can be carried out in similar fashion to that outlined above with reference to FIG. 2.

According to an additional embodiment, which is not shown in the figures, the antitheft or otherwise device in FIG. 2 is modified by using a single RFID chip instead of the optically readable code 24 and the RFID chip 72.

This single chip combines the features of the two RFID chips of the previous embodiment by operating both according to a first range of frequencies (for long-range reading) and according to a second range of frequencies (for short-range reading).

This single chip can therefore be read by two types of appliance as for the previous embodiment.

A memory area of the chip has a unique identifier TID that, as explained above with the previous embodiment, is associated (in a computer system) with a commercial article code (EAN, EPC, etc.) and with a URL address directly or indirectly related to the commercial article. The management/linking of the codes TID, EAN, URL address, etc. can be effected in similar fashion to that set out above with reference to FIG. 2.

It will be noted that the unique identification code TID may have a code portion that is used by a long-range RFID reader and another code portion that is used by a short-range RFID reader. A short-range RFID reader is an electronic communication appliance such as a mobile telephone of smartphone type as mentioned above (for example a "BlackBerry Bold 9790"or "Acer E320 Liquid Express" model). By way of example, the code is read fully by each appliance. However, software means are provided (in the appliances) for extracting, from the read information, only the portion of the information that is concerned by the appliance (information for the personnel of the shop or information representing, indirectly, a URL address or a website relating to the commercial article).

An example of a commercially available combined RFID chip is sold by the company LUX-IDent, for example. Such a chip takes the form of a prelaminated sheet combining an LF or HF communication technique and a UHF communication technique (two antennas on one and the same substrate).

FIG. 5 shows an antitheft device 100 having a head 102 provided with a point 104 and with a transparent protective interface 106 (for example: hood), for example welded or bonded to the head 102. A printing medium 108 bearing notably an optically readable code such as the code 24 in FIG. 1 is interposed between the interface 106 and the head 102.

The device likewise comprises a body 110 that has an orifice 112 for insertion of a point 104. By way of example, the body has a substantially hemispherical general shape and exhibits a substantially planar face 110a arranged in the equatorial plane, the orifice 112 being made in said face.

The body 110 contains a cavity 114 that contains ball-bearing locking means (locking mechanism), which are not shown. Several ball bearings are placed in a funnel inside the cavity 114, in one and the same plane and so as to form a central space between them to receive the point 104. When the point is inserted into the orifice and into the space between the ball bearings, the ball bearings are wedged in the convergent portion of the funnel. Any attempt at axial withdrawal of the point tends to force the ball bearings into the convergent portion of the funnel more and hence to block the point (locked position of two portions of the device captively holding a commercial article 120 between them). It will be noted that the ball bearings are made of a magnetic material, which thus allows them to be extracted from the convergent portion of the funnel under the action of an external magnetic field.

The body 110 likewise has, at the periphery of the central cavity 114, an annular chamber 116 that contains a component 118, or even several components, that is passive, for example, that is to say that is capable of receiving electromagnetic waves from a source outside the device. Such a component may take the form of a resonant circuit of LC type, for example.

Alternatively, the body may contain one or more active components, that is to say components that are capable of transmitting electromagnetic waves to the outside of the device and of receiving them therefrom. By way of example, such active or passive components are coils with ferrite, with or without a capacitor, LCR circuits, magnetic elements, circuits of RFID type equipped with an active or passive memory chip, electronic microsensors, etc. Said component(s) cooperate(s), by means of the transmission of electromagnetic waves, with a detection system, such as a gate or an antenna, placed at the point of access to the shop in which the article to be protected is on sale, in order to trigger an alarm in the event of detection of the device at the access point.

FIG. 6 illustrates a variant embodiment of an antitheft device, only the head 130 of which has been shown. The head comprises a medium 132 for an optically readable code on which the code has been printed beforehand (for example: code 24 in FIG. 1), for example. This medium is arranged between the transparent protective interface 134 and the base of the head and an active or passive component 136 installed in the housing that exists between the base of the head and the medium. The component 136 is capable of transmitting and/or receiving electromagnetic waves from an external source. The passive component takes the shape of a resonant circuit of LC type, for example, for which a plurality of electrical conductors have been shown. An active component requires power supply means.

The invention claimed is:

1. A method for providing security for a commercial article, said method comprising:
   fixing a device to said commercial article, the device having
      at least one active or passive component that is capable of transmitting electromagnetic waves to an outside of the device or of receiving electromagnetic waves from the outside,
      means for fixing and locking the device to the physical object or to the packaging thereof in a locked position so that a user cannot separate the device from the physical object without an external tool,
      said locking means comprising a locking mechanism, at least one optically readable code uniquely identifying the physical object to which the device is intended to be fixed and that is distinct from a commercial article code assigned to the physical object, as a commercial article, the at least one optically readable code is protected from the outside by a transparent protection interface, and the at least one optically readable code is representative of a URL address for a site or for a web page in relation to the commercial article to which the device is intended to be fixed and locked, associating said at least one optically readable code of the device with the commercial article code assigned to the physical object, as a commercial article, to which the device is intended to be fixed, the at least one optically readable code is representative of a URL address for a site or for a web page in relation to the commercial article to which the device is intended to be fixed and locked, the method including the association between said at least one optically readable code and the commercial article and notably the information about an point of sale of the commercial article and optionally the URL address of the site or of the web page dedicated to the commercial article;

dissociating said at least one optically readable code and/or the identifier TID borne by the device with the commercial article code assigned to the physical object when a commercial transaction has been carried out on said physical object and said device has been separated from the latter.

2. The method as claimed in claim 1, wherein, with the device, said at least one optically readable code cannot be accessed from the outside of the device.

3. The method as claimed in claim 1, wherein said device has two portions, namely a head equipped with a point that is intended to pass through the physical object or the packaging thereof and a body provided with an orifice for the insertion of the point and of locking means for said point in the body, said at least one optically readable code being borne by the head and/or the body.

4. The method as claimed in claim 1, wherein, with the device, said at least one optically readable code is capable of being read by an electronic communication appliance.

5. The method as claimed in claim 1, wherein, with the device, said at least one optically readable code incorporates a string of alphanumeric characters that is decodable by a software application that can be executed on an electronic communication appliance, so as thus to allow unique and secure identification of the commercial article.

6. The method as claimed in claim 5, wherein the decoding allows access to a secure memory area of a computer system, which secure memory area has an association table recorded that sets up an association between said at least one optically readable code and the commercial article/commercial article code and particularly a point of sale of the commercial article.

7. The method as claimed in claim 5, wherein the decoding allows setup of a secure connection to a URL address for a site or for a web page dedicated to the commercial article by means of an association table setting up an association between said at least one optically readable code, said URL address and optionally the commercial article code.

8. The method as claimed in claim 1, wherein, with the device, said at least one optically readable code is a two-dimensional code, notably a QR code or a code of data matrix type.

9. The method as claimed in claim 1, wherein, with the device, said at least one optically readable code is capable of uniquely identifying a plurality of other physical objects to each of which the device is intended to be successively fixed.

10. The method device as claimed in claim 1, wherein the device is fitted with at least one RFID component that has a unique identifier TID.

11. The method as claimed in claim 1, further comprising the step of recording each association in a memory area of a computer system.

12. The method as claimed in claim 11, further comprising the step of recording each association in a memory area of a computer system, and wherein the association of the identifier TID with said at least one optically readable code of said at least one device is recorded in a first memory area.

13. The method as claimed in claim 11, further comprising the step of recording each association in a memory area of a computer system, and wherein the association of the identifier TID with the URL address of the site or of the web page dedicated to the commercial article and to said commercial article code is recorded in a second memory area.

14. The method as claimed in claim 11, further comprising the step of recording, in a memory area of a computer system, firstly, each reading of said at least one optically readable code of the device by an electronic mobile communication appliance such as a smartphone and, secondly, each subsequent action performed by a user by means of said appliance on the basis of an information that the user has been able to access following the reading of said at least one optically readable code.

15. The method as claimed in claim 1, further comprising the step of fixing a second device to a commercial article, where each device has a first and a second optically readable code uniquely identifying a first and a second physical object to which the two devices are respectively intended to be fixed, means for associating each of the first and second optically readable codes with one and the same commercial article code assigned to the first and second physical objects.

16. The method as claimed in claim 1, wherein said method comprises the fixing and locking of the device to a physical object that has been assigned the commercial article code that is associated with said at least one optically readable code of the device.

17. The method as claimed in claim 1, further comprising the step of reading said at least one optically readable code of the device by an electronic mobile communication appliance such as a smartphone.

18. The method as claimed in claim 17 wherein said at least one optically readable code incorporates a string of alphanumeric characters that is decodable by a software application that can be executed on an electronic communication appliance such as a smartphone, so as thus to allow unique and secure identification of the commercial article, and the reading of said at least one optically readable code comprises the decoding of the string of alphanumeric characters by the software application executed on the electronic mobile communication appliance.

19. The method as claimed in claim 18, wherein the decoding comprises access to a secure memory area of a computer system, which memory area has an association table recorded that sets up an association between said at least one optically readable code and the commercial article and notably a location of the commercial article.

20. The method as claimed in claim 19, further comprising the identification of the user of the mobile communication appliance who wishes to access the secure memory area and, in the case of a new user, the creation of a user account.

21. The method as claimed in claim 19 further comprising the setup of a secure connection to a URL address for a site or for a web page dedicated to the commercial article by means of the association table that sets up an association between said at least one optically readable code and said URL address.

22. The method as claimed in claim 21, comprising at least one of the following actions triggered on the basis of the site or the web page displayed on the mobile communication appliance: obtainment of a number of physical objects in stock that have the same commercial article code, obtainment of the features of the physical object, selection and storage of the commercial article in a virtual basket or in a list of selected articles, performance of a transaction for the purpose of purchasing the physical object fitted with the device or other physical objects, performance of a transaction for the purpose of purchasing at least one other physical object in relation to the physical object fitted with the identification device by means of a computer gateway between, firstly, said site or said web page displayed on the mobile communication appliance and dedicated to the commercial article and, secondly, another site or another web page offering identical and/or associated commercial objects/articles.

\* \* \* \* \*